(12) United States Patent
Sakina

(10) Patent No.: US 7,719,743 B2
(45) Date of Patent: May 18, 2010

(54) REFLECTIVE LIGHT MODULATOR AND PROJECTOR DEVICE

(75) Inventor: Noriaki Sakina, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/890,898

(22) Filed: Aug. 8, 2007

(65) Prior Publication Data

US 2008/0037095 A1      Feb. 14, 2008

(30) Foreign Application Priority Data

Aug. 9, 2006    (JP) .......................... P2006-217174

(51) Int. Cl.
  *G02B 26/00* (2006.01)
  *G02F 1/153* (2006.01)
(52) U.S. Cl. .................. 359/237; 359/269; 359/290
(58) Field of Classification Search ................. 359/237, 359/290–292, 295, 267, 269, 298
  See application file for complete search history.

(56) References Cited

U.S. PATENT DOCUMENTS

| | | | |
|---|---|---|---|
| 5,731,797 A * | 3/1998 | Akiyama et al. | ............... 345/97 |
| 5,743,611 A | 4/1998 | Yamaguchi et al. | |
| 2004/0259326 A1* | 12/2004 | Hideo | ......................... 438/458 |

FOREIGN PATENT DOCUMENTS

| | | |
|---|---|---|
| JP | 9 105901 | 4/1997 |
| JP | 9 113906 | 5/1997 |
| JP | 10 123964 | 5/1998 |
| JP | 2000 206507 | 7/2000 |
| JP | 2001 215491 | 8/2001 |
| JP | 2003 131164 | 5/2003 |
| JP | 2004 70163 | 3/2004 |
| JP | 2004 245914 | 9/2004 |
| JP | 2005 202332 | 7/2005 |
| JP | 2005 266508 | 9/2005 |
| JP | 2006 184872 | 7/2006 |

* cited by examiner

*Primary Examiner*—Scott J Sugarman
*Assistant Examiner*—Dawayne A Pinkney
(74) *Attorney, Agent, or Firm*—Frommer Lawrence & Haug LLP; William S. Frommer; Ellen Marcie Emas

(57) ABSTRACT

A reflective light modulator is provided. The reflective light modulator includes: a transparent electrode passing through light from a light source; a driving substrate configured to reflect the light from the transparent electrode; a light-modulating material sandwiched between the transparent electrode and the driving substrate; and a transparent glass substrate. The transparent glass substrate is arranged in contact with the surface of the transparent electrode substrate on the light source side. Furthermore, the transparent glass substrate has a thermal conductivity of 0.003 cal/(cm·sec·K) or more at 20° C.

8 Claims, 5 Drawing Sheets

REFLECTIVE LIGHT MODULATOR AND PROJECTOR DEVICE

CROSS REFERENCES TO RELATED APPLICATIONS

The present invention contains subject matter related to Japanese Patent Application JP 2006-217174 filed in the Japanese Patent Office on Aug. 9, 2006, the entire contents of which being incorporated herein by reference.

BACKGROUND OF THE INVENTION

1. Field of the Invention

The present invention relates to a reflective light modulator, in which a transparent glass substrate is arranged in contact with the surface of a transparent electrode substrate on the light source side thereof, and to a projector device using such a reflective light modulator.

2. Description of the Related Art

Projector devices have been widely applied as large-screen image-display devices. The projector device is a device in which light from a light source is input into an optical modulator and the light modulated by the optical modulator is then amplified and projected in response to video signals.

The optical modulators can roughly be divided into transmissive optical modulators (e.g., transmissive liquid crystal panels) through which incident light passes; and reflective optical modulators (e.g., reflective liquid crystal panels) from which incident light is reflected and emitted to the light source side.

In recent years, the needs of providing projector devices with high image qualities (including high intensity, high contrast, and high definition) and reducing the size of the projector devices have increased more and more. Therefore, a high-output lamp, such as a xenon lamp, has come to be used as a light source. Further, an optical modulator has been small-sized.

However, when light emitted from the high-output lamp is incident on a small optical modulator, the light heats up the optical modulator, thereby facilitating a decrease in optical characteristics due to overheating. In this case, it particularly occurs in a reflective light modulator where light enters in and outputs from the surface thereof on the light source side.

In related art, as a method for preventing an optical modulator from overheating, a method for cooling the optical modulator by external air, incorporated by a fan (air blower) mounted on a projector device has been typically employed. In this case, furthermore, a technology for hermetically closing the optical modulator by transparent glass placed around the optical modulator with spacing has also been proposed for preventing dust in the air from being attached to the optical modulator (refer to Japanese Unexamined Patent Application Publication No. H9-105901)

SUMMARY OF THE INVENTION

However, as the output of the light source lamp increases, cooling only with a fan becomes insufficient to prevent the degradation of characteristics of the optical modulator.

Furthermore, the technology described in the above patent document is to arrange dustproof transparent glass around the optical modulator with a space between them. In contrast, the present inventor has focused attention on the nonuniformity of the surface temperature of dustproof transparent glass as a cause of characteristic degradation due to the overheating of a reflective light modulator. In this case, the dustproof transparent glass is arranged without separation from an optical modulator. In other words, it is in contact with the surface of a transparent electrode substrate on the light source side. This fact will be described with reference to FIGS. 1A and 1B.

FIGS. 1A and 1B are diagrams showing the structure of a reflective liquid crystal panel where a dustproof transparent glass is arranged in contact with an electrode substrate. FIG. 1A is a cross sectional view and FIG. 1B is a plan view from the light source side. A liquid crystal material 55 is arranged between a transparent electrode (e.g., ITO electrode) substrate 51 on the light source side and a driving substrate 53 provided with a reflector 52. The liquid crystal material 55 is enclosed in place by a sealant 54. A dustproof transparent glass substrate 56 is attached on the surface of the transparent electrode substrate 51 by an adhesive 57.

A frame-shaped shade mask 58 is arranged on an edge portion of the surface of the transparent glass substrate 56. The shade mask 58 acts as a corner board and is used to prevent the sealant 54 from being exposed to light. For a front-type (front-projection type) projector device, a black material is typically used for the shade mask 58 to make the picture frame of a projected image clear.

In the case where a black material is used for the shade mask 58 in the reflective liquid crystal panel as described above, in particular, light incident from the light source will cause an undesirable increase in temperature of the shade mask 58. As a result, among all portions of the surface of the transparent glass substrate, the edge portion directly contacting with the shade mask 58 is raised in temperature. Even though the shade mask 58 has been elaborated using a low heat-absorption material or the like, the rise in temperature may not be sufficiently prevented because of high output of a light source lamp.

Furthermore, in the reflective liquid crystal panel in related art as described above, the transparent glass substrate 56 has been prepared using substantially the same glass material as that of the transparent electrode substrate 51 and the driving substrate 53. Therefore, the transparent glass substrate 56 can be prevented from distortion due to an internal stress on the ground of a difference in an amount of expansion when the temperature increased. As a specific example, when the transparent electrode substrate 51 has a thermal expansion coefficient of $3.0 \times 10^{-6}$/K and the driving substrate 53 has a thermal expansion coefficient of $3.7 \times 10^{-6}$/K, borosilicate glass having a thermal expansion coefficient of $3.7 \times 10^{-6}$/K may be used for the transparent glass substrate 56.

In this case, however, the borosilicate glass has a characteristic feature in that the thermal conductivity thereof is low (i.e., 0.0022 cal/(cm·sec·K) in thermal conductivity at 20° C.). Therefore, when the surface edge portion directly contacting with the shade mask 58 increases in temperature, the surface temperature becomes uneven because of difficulty in transmission of heat to the central portion of the surface.

When the surface temperature of the transparent glass substrate 56 becomes uneven as described above, the surface of the transparent glass substrate 56 shows an increase in nonuniformity of optical reflectance, which may cause disordered polarization at the time of light modulation. The disordered polarization may lead to image degradation, such as nonuniform illumination and a decrease in contrast, including that black may be gray around the screen when projecting a black image.

The present invention addresses the above-identified, and other problems associated with conventional methods and apparatuses. It is desirable to reduce and eliminate the non-uniformity of the surface temperature of a transparent glass substrate in a reflective modulator. In this modulator, a transparent glass substrate is arranged in contact with a transparent electrode substrate on a light source side as in the case with the reflective liquid crystal panel shown in FIGS. 1A and 1B. In such a modulator, it is also desirable to control the generation of distortion due to an internal stress when the temperature rises in addition to reducing and eliminating the nonuniformity of the surface temperature of the transparent glass substrate.

According to an embodiment of the present invention, there is provided a reflective light modulator including: a transparent electrode substrate passing through light from a light source; a driving substrate configured to reflect the light from the transparent electrode; a light-modulating material sandwiched between the transparent electrode substrate and the driving substrate; and a transparent glass substrate. The transparent glass substrate is arranged in contact with a surface of the transparent electrode substrate on the light source side. In addition, the transparent glass substrate has a thermal conductivity of 0.003 cal/(cm·sec·K) or more at 20° C.

In such reflective light modulator, the transparent glass substrate with a high thermal conductivity, that is, a thermal conductivity of 0.003 cal/(cm·sec·K) or more at 20° C., is arranged in contact with the surface of the transparent electrode substrate on the light source side. Therefore, for example, even if the temperature of the surface edge portion is raised by a frame-shaped shade mask shown in FIGS. 1A and 1B provided on the surface of the transparent glass substrate, such heat may tend to be transmitted to the center portion of the surface. Thus, the nonuniformity of the surface temperature can be reduced and eliminated. Consequently, the distortion of polarization at the time of light modulation, which is caused by the nonuniformity, can be controlled.

Preferably, the transparent glass substrate may be laminated on the transparent electrode substrate by applying an adhesive with a shore hardness of 40 A or less over the whole contact surface of the transparent glass substrate with the transparent electrode substrate. In the case where the thermal expansion coefficient of glass having a high thermal conductivity selected as a material of the transparent glass substrate is different from that of the transparent electrode substrate, they may be laminated with each other using a soft adhesive with a shore hardness of 40 A or less. In other words, a difference in an amount of expansion when the temperature increased can be absorbed and buffered by such a soft adhesive. Therefore, the generation of distortion due to an internal stress when the temperature rises can also be controlled.

According to another embodiment of the present invention, there is provided a projector device, including: a light source; an optical system for entering light from the light source into a reflective light modulator; and an optical system for projecting light modulated by the reflective light modulator. The reflective light modulator includes: a transparent electrode substrate passing through light from a light source; a driving substrate configured to reflect the light from the transparent electrode; a light-modulating material sandwiched between the transparent electrode substrate and the driving substrate; and a transparent glass substrate arranged in contact with a surface of the transparent electrode substrate on the light source side. The transparent glass substrate has a thermal conductivity of 0.003 cal/(cm·sec·K) or more at 20° C.

The projector device uses the reflective light modulator according to the above-described embodiment of the present invention. Therefore, even if a high-output lamp is used as a light source, the distortion of polarization at the time of light modulation in the reflective light modulator can be controlled.

The reflective light modulator according to an embodiment of the present invention can reduce and eliminate the nonuniformity of the surface temperature of the transparent glass substrate arranged in contact with the surface of the transparent electrode substrate on a light source side. Therefore, there is an advantage in lowering the distortion of polarization at the time of light modulation.

In addition, in the case where the whole surface of the transparent glass substrate is laminated on the transparent electrode substrate by an adhesive with a shore hardness of 40 A or less, there is an advantage in controlling distortion due to an internal stress when the temperature increased, even though the thermal expansion coefficient of the transparent glass substrate is different from that of the transparent electrode substrate.

The projector device according to an embodiment of the present invention can control the distortion of polarization at the time of light modulation in the reflective light modulator even when a high-output lamp is employed as a light source. Therefore, there is an advantage in that the device can be small-sized while attaining high image qualities with high definition and so on as well as controlling nonuniform illumination and a decrease in contrast at the time of projecting a black image.

BRIEF DESCRIPTION OF THE DRAWINGS

FIG. 1A is a cross sectional view and FIG. 1B is a plan view from the light source side;

FIG. 2A is a cross sectional view and FIG. 2B is a plan view showing from the light source side;

FIG. 3A is provided for a transparent glass substrate and FIG. 3B is provided for borosilicate glass;

FIG. 4A and FIG. 4B are provided for different transparent glass substrates.

DESCRIPTION OF THE PREFERRED EMBODIMENTS

Hereinafter, a reflective liquid crystal panel as an embodiment of the present invention will be specifically described with reference to the attached drawings.

Figure 1A:
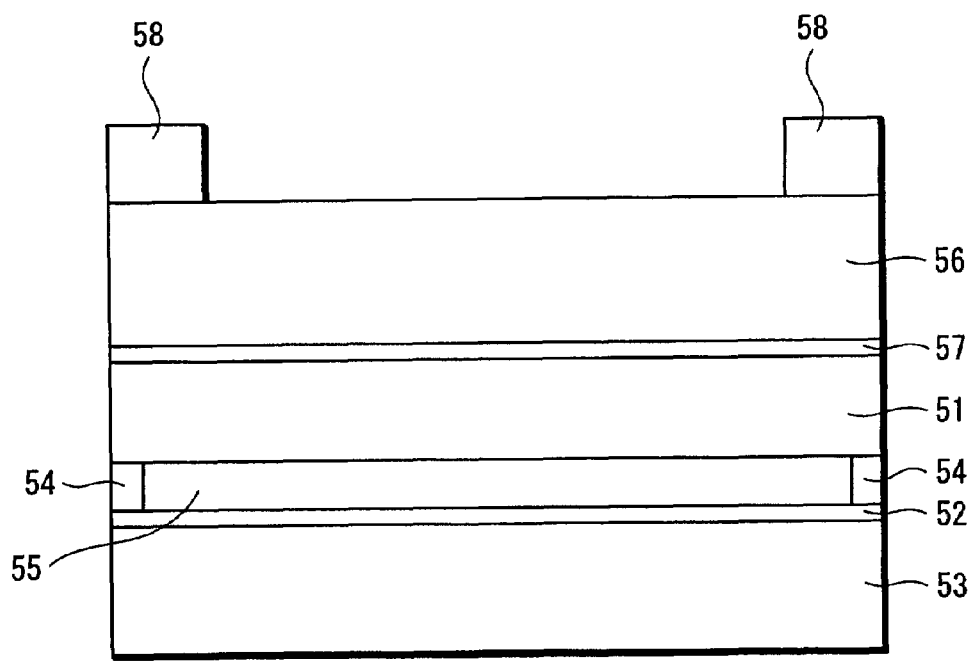
FIGS. 1A and 1B are diagrams illustrating the structure of a reflective liquid crystal panel arranged in which a dustproof transparent glass is arranged in contact with a transparent glass, where
Figure 1B:
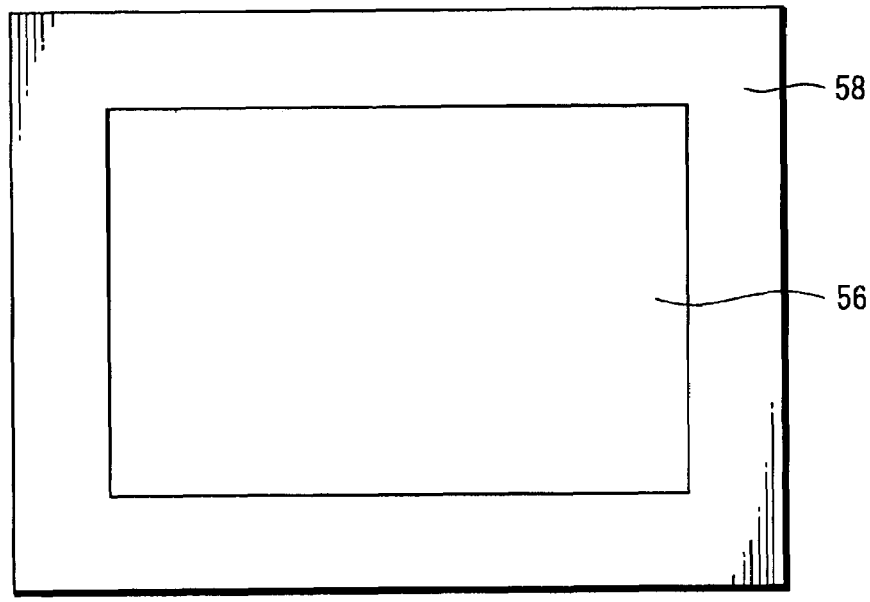
Figure 2A:
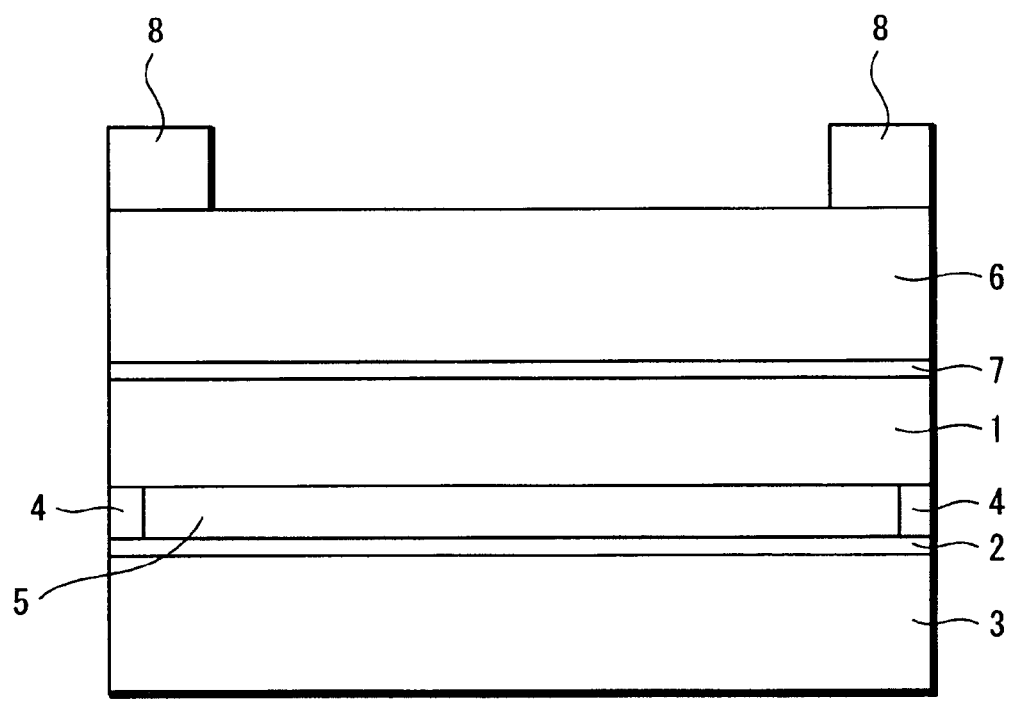
FIGS. 2A and 2B are diagrams illustrating the structure of a reflective liquid crystal panel to which an embodiment of the present invention is applied, where
Figure 2B:
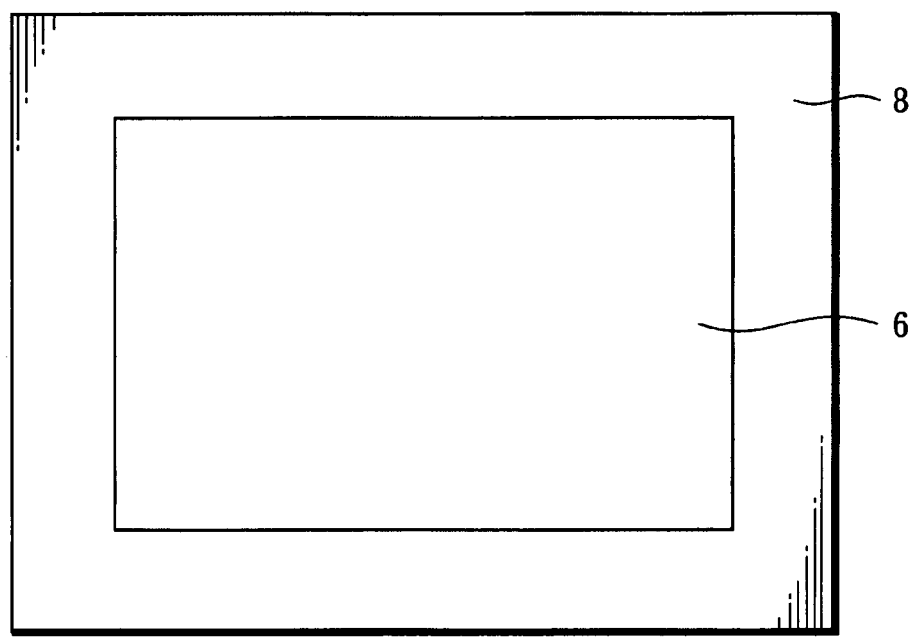

FIGS. 2A and 2B show a configuration of the reflective liquid crystal panel to which an embodiment of the present invention is applied, where FIG. 2A is a cross-sectional view and FIG. 2B is a plan view showing from the light source side.

According to an embodiment of the present invention, a transparent electrode substrate 1 is made of a transparent substrate including a transparent electrode formed on the side of a liquid crystal material 5 and passing through light from a light source. A driving substrate 3 includes a reflecting electrode configured to reflect light incident from the light source side through the liquid crystal material 5 on each of pixels arranged in the form of matrix. Further, the driving substrate 3 includes a drive circuit provided between the reflecting electrodes and the transparent electrode substrate 1 to apply a voltage in response to a video signal. In order to simplify an explanation, a plurality of reflecting electrodes are hereinafter referred to as a reflector 2.

The liquid crystal material 5 is placed between the transparent electrode (e.g., ITO electrode) substrate 1 on the light source side and the driving substrate 3 provided with the reflector 2 and enclosed in place by a sealant 4. The transparent electrode substrate 1 has a thermal expansion coefficient of $3.0 \times 10^{-6}$/K. In contrast, the driving substrate 3 has a thermal expansion coefficient of $3.7 \times 10^{-6}$/K.

On the surface of the transparent electrode substrate 1 on the light source side, a dustproof transparent glass substrate 6 is arranged in contact with the transparent electrode substrate 1. The transparent glass substrate 6 is laminated on the transparent electrode substrate 1 by applying an adhesive 7 over the whole contact surface of the transparent glass substrate 1 with the transparent electrode 6. The transparent electrode substrate 1 has a thickness of about 0.7 mm. The transparent electrode substrate 1 has a thickness of about 1.1 mm. The layer of the adhesive 7 formed between the transparent electrode 1 and the transparent glass substrate 6 has a thickness of about 10 µm.

The material of the transparent glass substrate 6 may be silica glass. The silica glass may be one having a high conductivity (e.g., a thermal conductivity of 0.033 cal/(cm·sec·K) or more at 20° C.).

The adhesive 7 used may be a soft adhesive with a shore hardness of 9 A to 40 A (typically referred to as an "ultraviolet (UV) curable adhesive".

On the surface of the transparent electrode substrate 1, an anti-reflection film (not shown) is formed. In addition, on the edge portion of the surface of the transparent glass substrate 6, a frame-shaped black shade mask 8 is arranged. The shade mask 8 acts as a corner board and plays a role in preventing the sealant 4 from being exposed to light.

Figure 3A:
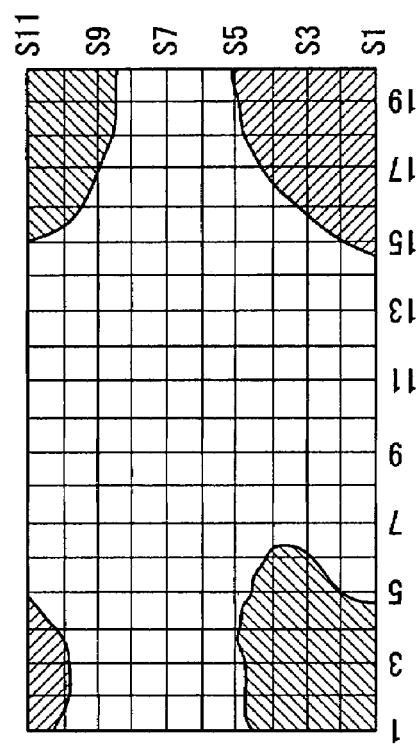
FIGS. 3A and 3B are diagrams illustrating a reflectance distribution on the surface of a transparent glass substrate shown in FIG. 2, where
Figure 3B:
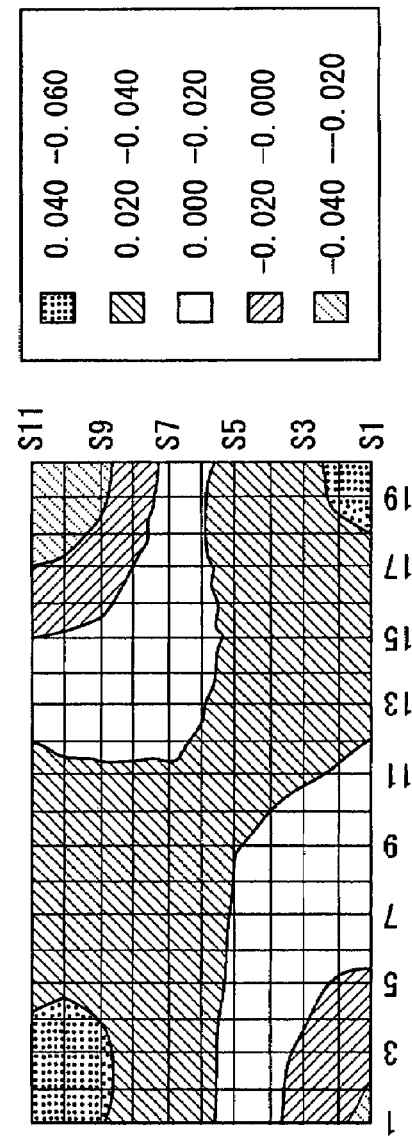

FIGS. 3A and 3B show measurement results with respect to the reflectance distribution on the surface of the transparent glass substrate 6 when light from the high-output lamp is incident on the reflective liquid crystal panel. FIG. 3A shows a measurement result according to an embodiment when the silica glass is used. FIG. 3B shows a measurement result when a transparent glass substrate made of borosilicate glass is used for comparison.

The incident light from the high-output lamp causes, in particular, an undesirable increase in temperature of the black shade mask 8. As a result, among all portions of the surface of the transparent glass substrate 6, the edge portion directly contacting with the shade mask 8 is raised in temperature. However, the transparent glass substrate 6 is silica glass with a high thermal conductivity, so that the heat thereof can easily be transmitted to the center portion of the surface. As a result, as shown in FIG. 3A, the surface temperature of the transparent glass substrate 6 may not be so uneven, thereby resulting in a decrease in nonuniformity of the light reflectance of the surface of the transparent glass substrate 6.

In contrast, borosilicate glass has a low thermal conductivity (i.e., 0.0022 cal/(cm·sec·K) in thermal conductivity at 20° C.). Therefore, when the surface edge portion increases in temperature, the heat is hardly transmitted to the center portion of the surface. As a result, as shown in FIG. 3B, the surface temperature becomes uneven, causing an increase in nonuniformity of the light reflectance of the surface of the transparent glass substrate 6.

As described above, according to an embodiment of the reflective liquid crystal panel, the nonuniformity of the surface temperature of the transparent glass substrate 6 can be reduced and eliminated even if the presence of the shade mask 8 causes an increase in temperature. In other words, such nonuniformity is reduced and eliminated even when the edge portion of the surface of the transparent glass substrate 6 increases in temperature. Thus, nonuniformity of the light reflectance on the surface of the transparent glass substrate 6 can be reduced. Consequently, distortion of polarization at the time of light modulation can be reduced.

Figure 4A:
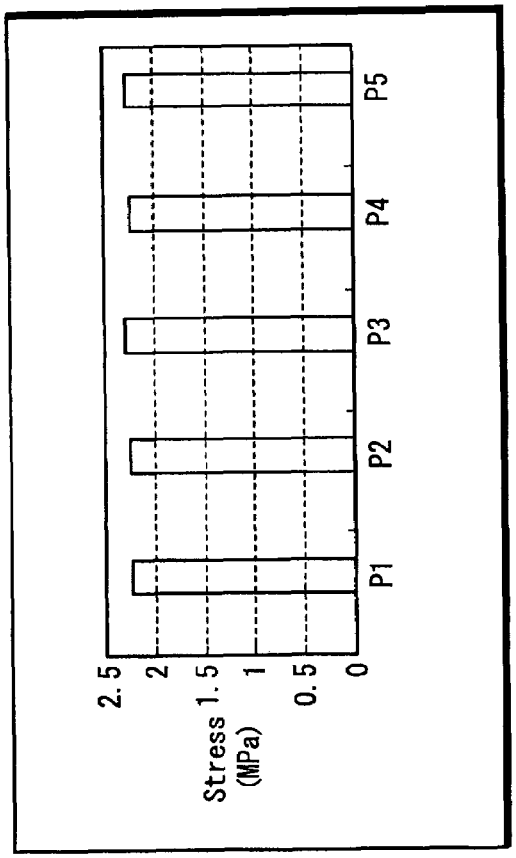
FIGS. 4A and 4B are diagram illustrating the stress applied on the transparent glass substrate shown in FIG. 2, where
Figure 4B:
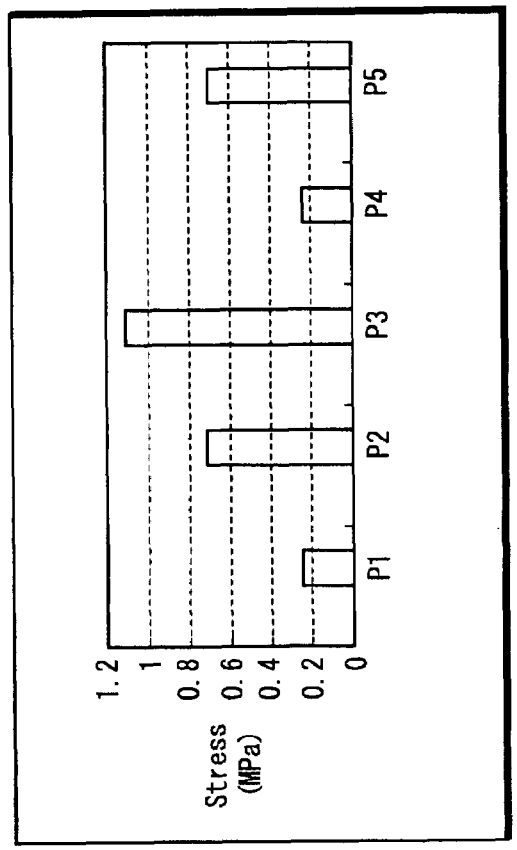

FIGS. 4A and 4B show simulation results of stresses on four corners (points P1, P2, P4, and P5) and the center (point P3) of the transparent glass substrate 6. FIG. 4A shows a simulation result according to the embodiment. FIG. 4B shows a simulation result when laminating the transparent glass substrate 6 using, for comparison, a hard adhesive with a shore hardness of 75 A instead of the adhesive 7.

As described above, the transparent electrode substrate 1 and the driving substrate 3 have thermal expansion coefficients of $3.0 \times 10^{-6}$/K and $3.7 \times 10^{-6}$/K, respectively. The material of the transparent glass substrate 6 was selected on the basis of a high thermal conductivity (not selected so that the thermal expansion coefficient would be substantially equal to that of the transparent electrode substrate 1 or the driving substrate 3). Therefore, typically, the thermal expansion coefficient of the transparent glass substrate 6 may be different from that of the transparent electrode substrate 1. Thus, when the temperature of the reflective liquid crystal panel increases as a result of light incident from the high-output lamp, the amount of expansion of the transparent glass substrate 6 becomes different from that of the transparent electrode substrate 1.

However, according to an embodiment of the reflective liquid crystal panel, the soft adhesive with a shore hardness of 9 A to 40 A is used to laminate the whole surface of the transparent glass substrate 6 on the transparent electrode substrate 1. Accordingly, the difference in the amounts of the expansion when the temperature increases can be buffered and absorbed by the soft adhesive. As a result, as shown in FIG. 4A, the stresses on the four corners of the transparent glass substrate are substantially smaller than those of the substrate using the hard adhesive (FIG. 4B). Consequently, according to an embodiment of the reflective liquid crystal panel, generation of distortion caused by internal stress when the temperature increases can also be controlled.

Figure 5:
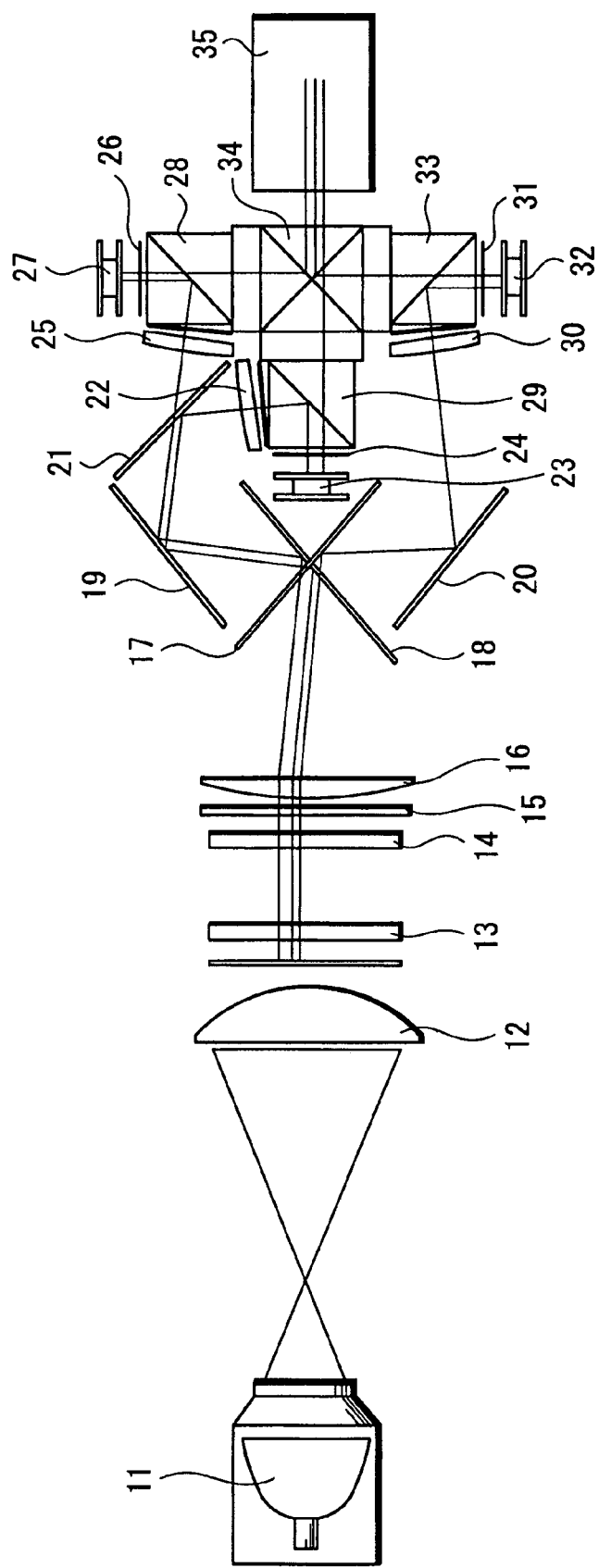
FIG. 5 is a diagram illustrating an optical system of a liquid crystal projector device to which an embodiment of the present invention is applied.

Next, an example of a liquid crystal projector device employing the reflective liquid crystal panel shown in FIGS. 2A and 2B will be described. FIG. 5 is a diagram showing an optical system of the liquid projector device employing the reflective liquid crystal panel shown in FIGS. 2A and 2B. White light emitted from a light source, a xenon lamp 11, passes through a collimator lens 12, an integrator formed of a first fly-eye lens 13 and a second fly-eye lens 14, a polarization converter (e.g., an element for converting an S-polarization component into a P-polarization component) 15, and a main condenser lens 16. Subsequently, the light is incident on a blue reflection dichroic mirror 17 and a green red reflection dichroic mirror 18.

A red light component of the white light incident on the dichroic mirrors 17 and 18 is reflected on the dichroic mirror 18 and then reflected on a total reflection mirror 19. The reflected light passes through a green reflection dichroic mirror 21 and is then reflected on a polarization beam splitter (PBS) 28 via a condenser lens 25. Subsequently, a red reflective liquid crystal panel 27 is irradiated with the reflected light passed through a ¼-wavelength plate 26.

In addition, a green light component of the white light incident on the dichroic mirrors 17 and 18 is reflected on the dichroic mirror 18, the total reflection mirror 19, and the green reflection dichroic mirror 21 in order. The reflected light is further reflected on a PBS 29 via a condenser lens 22. Subsequently, a green reflective liquid crystal panel 23 is irradiated with the reflected light passed through a ¼-wavelength plate 24.

Furthermore, a blue light component of the white light incident on the dichroic mirrors 17 and 18 is reflected on the dichroic mirror 17 and is then reflected on a total reflection mirror 20. Subsequently, the reflected light is further reflected on a PBS 33 via a condenser lens 30. A blue reflective liquid crystal panel 32 is irradiated with the reflected light passed through a ¼-wavelength plate 31.

Furthermore, each of the red reflective liquid crystal panel 27, the green reflective liquid crystal panel 23, and the blue reflective liquid crystal panel 32 is the reflective liquid crystal panel having the structure shown in FIGS. 2A and 2B.

The red, green, and blue light incident on the red, green, and blue reflective liquid crystal panels 27, 23, 32 pass through liquid crystal layers (not shown) in the panels 27, 23, and 32 and are then reflected on reflectors (not shown) therein, respectively. Subsequently, the light passes through the liquid crystal layers again and is then emitted from the liquid panels 27, 23, and 32, respectively. In this case, when the red, green, and blue light pass through the respective liquid crystal layers, they can be modulated in response to R, G, and B video signals, respectively.

Subsequently, the red light modulated by the red reflective liquid crystal panel 27 passes through the PBS 28, the green light modulated by the green reflective liquid crystal panel 23 passes through the PBS 29, and the blue light modulated by the blue reflective liquid crystal panel 32 passes through the PBS 33. Afterward, the red, green, and blue light are combined together by a cross prism 34 and then projected on a screen (not shown) through a projection lens 35.

In the liquid crystal projector device, each of the red reflective liquid crystal panel 27, the green reflective liquid crystal panel 23, and the blue reflective liquid crystal panel 32 corresponds to the reflective liquid crystal panel having the structure shown in FIGS. 2A and 2B. Therefore, even when the high-output xenon lamp 11 is used as a light source, the distortion of polarization at the time of light modulation in each of the red, green, and blue reflective liquid crystal panels 27, 23, and 32 can be controlled. Therefore, the device can be small-sized while attaining high image qualities with high definition and so on, as well as controlling nonuniform illumination and a decrease in contrast at the time of projecting a black image.

Furthermore, the example shown in FIG. 5 employs a three-panel liquid crystal projector device including the reflective liquid crystal panel shown in FIGS. 2A and 2B for each of red, green, and blue reflective liquid crystal panels. The reflective liquid crystal panel shown in FIGS. 2A and 2B may also be employed in a mono-panel liquid crystal projector device.

Furthermore, the example shown in FIGS. 2A and 2B uses silica glass as the material of the transparent glass substrate 6. However, other kinds of glass than silica glass may be used for a material thereof as far as it has a high thermal conductivity ((i.e., approximately 0.003 cal/(cm·sec·K) or more in thermal conductivity at 20° C.).

Furthermore, in the example shown in FIGS. 2A and 2B, the shade mask 8 is arranged on the edge portion of the surface of the transparent glass substrate 6. Alternatively, an embodiment of the present invention may be applied to a reflective liquid crystal panel where the shade mask is not arranged on the surface of the transparent glass substrate 6. In this case, examples of such a reflective liquid crystal panel may include one provided with no shade mask in production and shipment, but provided with the shade mask on the demand of a recipient or user. Furthermore, an embodiment of the present invention may be applied to a reflective liquid crystal panel in which the shade mask is arranged but not in contact with the surface of the transparent glass substrate.

Furthermore, in the example shown in FIGS. 2A and 2B, an embodiment of the present invention is applied to the reflective liquid crystal panel. Alternatively, an embodiment of the present invention may also be applied to a reflective light modulator in which other light-modulating materials than the liquid crystal material may be sandwiched between the transparent electrode substrate and the driving substrate.

It should be understood by those skilled in the art that various modifications, combinations, sub-combinations and alterations may occur depending on design requirements and other factors insofar as they are within the scope of the appended claims or the equivalents thereof.

What is claimed is:

1. A reflective light modulator, comprising:
   a driving substrate configured to reflect light;
   a light-modulating material provided on a surface of the driving substrate;
   a transparent electrode substrate, provided on a surface of the light-modulating material, passing through light from a light source;
   a transparent glass substrate arranged in contact with a surface of the transparent electrode substrate on the light source side and having a thermal conductivity of 0.003 cal/(cm·sec·K) or more at 20° C.; and
   an adhesive formed between the transparent glass substrate and the transparent electrode substrate, the adhesive having a shore hardness of 40 A or less wherein the adhesive is formed over the whole contact surface of the transparent glass substrate with the transparent electrode substrate.

2. The reflective light modulator according to claim 1, wherein
   a thermal expansion coefficient of the transparent glass substrate is different from a thermal expansion coefficient of the transparent electrode substrate.

3. The reflective light modulator according to claim 1, wherein
   a frame-shaped shade mask is arranged on an edge portion of the surface of the transparent glass substrate.

4. The reflective light modulator according to claim 1, wherein
   a material of the transparent glass substrate is silica glass.

5. A projector device, comprising:
   a light source;
   an optical system for entering light from the light source into a reflective light modulator; and
   an optical system for projecting modulation light modulated by the reflective light modulator, wherein
   the reflective light modulator includes
   a driving substrate configured to reflect light;
   a light-modulating material provided on a surface of the driving substrate;
   a transparent electrode substrate, provided on a surface of the light-modulating material, passing through light from a light source;
   a transparent glass substrate arranged in contact with a surface of the transparent electrode substrate on the light source side and having a thermal conductivity of 0.003 cal/(cm·sec·K) or more at 20° C.; and an adhesive formed between the transparent glass substrate and the transparent electrode substrate, the adhesive having a shore hardness of 40 A or less, wherein the adhesive is formed over the whole contact surface of the transparent glass substrate with the transparent electrode substrate.

6. The projector device according to claim 5, wherein a thermal expansion coefficient of the transparent glass substrate is different from a thermal expansion coefficient of the transparent electrode substrate.

7. The reflective light modulator according to claim 1, wherein light from the light source passes through the transparent electrode, and the light-modulating material and is reflected by the driving substrate.

8. The projector according to claim 5, wherein light from the light source passes through the transparent electrode, and the light-modulating material and is reflected by the driving substrate.

* * * * *